United States Patent Office
3,849,547
Patented Nov. 19, 1974

3,849,547
COLORED NAIL POLISHES
Gregoire Kalopissis, Paris, France, assignor to Societe Anonyme dite: L'Oreal, Paris, France
No Drawing. Continuation-in-part of abandoned applications Ser. No. 655,741, July 25, 1967, and Ser. No. 749,315, Aug. 1, 1968. This application Feb. 2, 1971, Ser. No. 112,037
Int. Cl. A61k 7/04
U.S. Cl. 424—61   12 Claims

ABSTRACT OF THE DISCLOSURE

Nail polish or lacquer composition consists essentially of a solution of 12-15 weight percent nitrocellulose film former, 6-13 weight percent aryl sulfonamide formaldehyde resin, 1-15 weight percent plasticizer, 5-8 weight percent coupler, 12-32 weight percent diluent, 0.5-6 weight percent soluble colored polymer and the remainder benig essentially a solvent selected from acetone, ethyl acetate, butyl acetate, methyl acetate and mixtures thereof. The soluble colored polymer has condensed thereon an aromatic azo, anthraquinone or benzene dye containing an extra nuclear radical of the formula

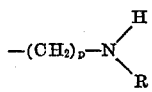

wherein $p$ is 2-6 and R is hydrogen, —$CH_3$ or —$C_2H_5$. The extra nuclear radical is bonded to the aromatic nucleus of the dye through a nitrogen atom directly attached to the aromatic nucleus of the dye. The dye is bonded to the polymer by an amide bond through the terminal nitrogen atom of the extra-nuclear radical. Optionally n-butyl alcohol can also be condensed on the polymer.

Alternatively the soluble colored polymer can be one having one or more reactive chlorine atoms and to which polymer there is bonded by quaternization a dye having a tertiary amine function.

---

This application is a continuation-in-part of my earlier applications Ser. No. 655,741, filed July 25, 1967, and Ser. No. 749,315, filed Aug. 1, 1968, both now abandoned.

This invention relates to nail polish compositions containing as the coloring agent, a colored polymer in which the groups which impart color to the polymer are chemically bonded to the polymer molecule.

It has long been known that nail polish or lacquer contains as essential ingredients a film former, a resin, a plasticizer, a solvent and a pigment. One of the most commercially acceptable film formers employed is nitrocellulose and specifically nitrocellulose designated as "RS" or "SS," the former containing about 11.2 to 12.8% nitrogen and being soluble in esters such as ethylacetate and its homologues, ketones and glycol ethers, and the latter containing about 10.7 to 11.2% nitrogen and being soluble in mixtures of alcohol and toluene, with the former being preferred.

Known resins usefully employed in prior art nail polishes, enamels or lacquers include synthetic drying and non-drying alkyd resins, polyvinylacetate, various polyester resins and arylsulfonamide-formaldehyde resins. With regard to the latter, equimolecular proportions of formaldehyde and p-toluene sulfonamide, condense to a viscous mass. Heating this mass to 110° C. yields a hard colorless resin.

Representative plasticizers employed in conventional nail polishes include tricresyl phosphate, benzyl benzoate, tributyl phosphate, butyl acetyl ricenoleate, dibutyl phthalate, butyl phthalyl, butyl glycolate, dicoctyl phthalate, butyl stearate, triphenyl phosphate, triethyl citrate, camphor, castor oil, dibutoxy ethyl phthalate, dibutyl tartrate and diamyl phthalate.

In known nail polishes or lacquers which are nitrocellulose-based, the solvents employed have been generally classified in three interrelated categories, i.e., as active solvents, couplers or latent solvents and as diluents. Active solvents include esters, ketones and glycol ethers and are true solvents for nitrocellulose. Couplers are generally alcohols including ethyl alcohol, isopropylalcohol, n-butylalcohol and amyl alcohol, while diluents are generally aromatic and aliphatic hydrocarbons such as hexane, toluene, xylene and light petroleum naphthas.

However, one of the more limiting criteria for producing an acceptable nail polish or lacquer in the past has been the choice of the coloring agent to be employed in the desired formulation. Thus, as pointed out in "Cosmetics, Science and Technology," Ed. Edward Sagarin, Interscience Publishers, 1966 at p. 683, the choice has been limited essentially to coloring agents which are insoluble or substantially insoluble in lacquer solvents so as to avoid staining and discoloration of the nails and which will not react with the lacquer vehicle. The author, continuing on p. 684 of this reference, states that soluble dyes are only sparingly used because of their staining characteristics on the user's skin or nails and generally are employed only to tint lacquer removers. It has also, however, been known to use solvent-soluble dyes in very special cases in which a very slightly colored polish is desired, i.e. one which imparts a very pale tint to the nail. However, it has been found that if an attempt is made to obtain polishes with lasting shades using coloring materials which are soluble in the polish, the coloring material also dissolves in the keratinic substance composing the nail, especially after repeated applications, so that after the polish has been removed by a solvent, the nail remains discolored or stained.

Insoluble coloring agents or materials recommended in the above reference include the lithols (D & C Reds Nos. 10, 11, 12 and 13), lithol rubines (D & C Red No. 7) and TOB-BON Maroon (D & C Red No. 34). A few lake colors have also been suggested such as D & C Yellow No. 5 Lake, D & C Red No. 2 Lake and Ext D & C Red No. 2 Lake. In addition to these organic coloring agents, such inorganic materials as cosmetic grade or purified titanium dioxide, yellow and red iron oxides, iron blue, iron black, ultramarine blue and chrome oxide greens have also been suggested for use in nail polish or lacquer formulations as the coloring agent. But one important criteria in the choice of the coloring agent is its non-staining effect on the skin or nail and the common characteristic of those coloring agents heretofore employed has been its insolubility in the nail polish composition.

The use of such insoluble coloring agents has serious drawbacks because the resulting nail polish or enamel lacks a desirable degree of luminosity which is a sought-after characteristic in transparent polishes. This drawback is further accentuated when pearlescent and colored polishes are desired since the opacity imparted to the polish by the inorganic or non-soluble coloring agents, masks to a large extent the desired pearlescent effect.

The applicant has, however, by the present invention overcome the disadvantages of prior art nail polishes and has provided a nail polish or lacquer containing a soluble coloring agent, which polish is transparent and contains vivid and lasting colors but which does not have any substantial deleterious staining effect on the nail or skin. Further, the nail polishes of the present invention can contain materials which produce a pearlescent effect which remains essentially unmasked notwithstanding the deep coloration that can be imparted thereto, since the polish remains essentially transparent. Additionally, the nail polish of this invention can include white pigments to produce a creamy appearance having a brilliance and freshness of tint which has not heretofore been achieved.

In accordance with the present invention there is provided a nail polish composition comprising about 12–15 weight percent film former, about 6–13 weight percent resin, about 5–8 percent plasticizer, about 1–15 percent coupler, about 12–32 weight percent diluent, about 0.5–6 weight percent colored polymer as the coloring agent, the remainder being, essentially, solvent.

Preferably, the film former is nitrocellulose and as stated herein before lacquer grade nitrocellulose designated as "RS" and "SS" can be employed although "RS" nitrocellulose is preferred. Representative viscosity ranges of the preferred "RS" nitrocellulose include RS ¼ sec., RS ½ sec. and RS ¾ sec.

Preferably the resin utilized in the nail polish composition of this invention is aryl sulfonamide formaldehyde resin sold under the trade name "Santolite MHP." This resin has a softening point of approximately 62° C., is brittle at ordinary temperatures, is nearly colorless and is insoluble in drying oils but soluble in many organic solvents. Additionally it is compatible with nitrocellulose and most plasticizers.

As the plasticizer, there is employed, preferably, camphor or dibutylphthalate.

Propanol, isopropanol, butanol and ethanol are preferably used as couplers, while xylene and toluene are employed as diluents. Representative preferred active solvents utilized include acetone, ethyl acetate, butyl acetate and methylacetate.

When it is desired to impart a pearlescent or iridescent effect to the nail polish or lacquer there is employed a nacreous substance such as that sold under the trade name "Mearlmaid," a natural pearlescence or, similarly, essence of the Orient. This nacreous or pearlescent material can be employed in amounts of about 6–10 weight percent of said composition.

Inorganic pigments, such as titanium dioxide in amounts of about 1–3 weight percent can also be included in the novel nail polish composition of this invention.

As stated before, an important and critical concept of the present invention resides in the incorporation in the nail polish composition, as a coloring agent, of a colored polymeric material which is soluble therein to provide a composition which exhibits essentially no nail or skin staining effects.

Representative colored polymers which can be used in accordance with the present invention are:

The colored polymers comprising amide functions whose azotized portion consists of color-imparting groups consisting of aromatic diamines and, particularly, such polymers derived from acrylic amide.

These colored polymers, as well as processes for preparing them, are described in French Pat. No. 1,309,399 of Oct. 5, 1961, granted to applicant's assignee.

The copolymers made from monomers which can be used for obtaining resins compatible with the nail polishes, together with at least one monomer comprising a reactive chlorine to which at least one color-imparting group is chemically attached by quaternization.

The monomers containing a reactive chlorine can include, for example, vinyl chloroacetate or N-allylchloracetamide.

The other monomers which can be used to obtain resins compatible with nail polishes include, for example, vinyl esters such as vinyl acetate, vinyl lactams such as vinyl pyrrolidone, alkyl acrylates and methacrylates, substituted or unsubstituted acrylamides and methacrylamides, or unsaturated carboxylic acids such as crotonic acid, acrylic acid, methacrylic acid or itaconic acid.

Representative coloring agents which can be used for these polymers are those having a tertiary amine function.

These coloring agents can be chemically bonded, by quaternization, to polymers having one or more reactive chlorine atoms. Among these coloring agents are the azo dyes, the anthraquinone dyes, the azine dyes, as well as dyes derived from nitrophenylenediamines and quinolines.

Such dyes can be quaternized on the groups of these colorless copolymers containing a reactive chlorine such as vinyl chloroacetate or N-allyl-chloracetamide.

The preparation of such colored polymers can be made by introducing the monomers into a flask provided with an agitator, a reflux condenser, a thermometer and a tube for admitting nitrogen. A lower alkanol, such as ethanol and a catalyst such as diazoisobutyronitrile are added to the reactants. The mixture is heated to reflux for a sufficiently long period, i.e. up to and including, for instance, 20 hours to produce the colorless polymer which, after cooling, is admixed with ether to precipitate the colorless copolymer.

The resulting colorless copolymer and the dye can then be introduced into a reaction vessel provided with agitating means and a reflux condenser. To the vessel there is also introduced a solvent such as dioxane. The reactants are then heated to reflux. The resulting colored polymer is then precipitated and separated from the reaction mass.

There can also be used colored polymers made from monomers which are used to obtain resins compatible with nail polishes, together with at least one monomer having a reactive epoxy function to which an extra-nuclear amine dye is chemically bonded by condensation of its primary or secondary amine function.

Monomers comprising an epoxy function can be, for example, glycidyl methacrylate, glycidyl acrylate or allylglycidyl ether.

The other monomers which can be used to obtain resins compatible with nail polishes can be, for example, vinyl esters such as vinyl acetate, vinyl lactams such as vinylpyrrolidone, alkyl acrylates or methacrylates such as substituted or unsubstituted acrylamides or methacrylamides.

Representative extra-nuclear amino dyes which can be used to obtain these colored polymers are those corresponding to the following formula:

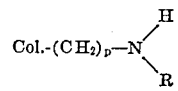

in which: $p$ is 2–6, R is selected from the group consisting of hydrogen, $-CH_3$ and $-C_2H_5$ and the Col. represents a cyclic or polycyclic dye selected from the group consisting of benzene and anthraquinone dye.

Among the dyes responding to the above definition, those having one or two supplementary amine functions attached directly to their ring are particularly useful.

These colored polymers can be prepared according to various known proceses. However, it seems preferable to carry out the polymerization in a solvent such as dioxane, dimethylformamide or a ketone, in the presence of a catalyst such as benzoyl peroxide or azodiisobutyronitrile and heating to reflux after which the copolymer can be precipitated by the addition of ether, for instance, to the cooled reaction mass.

The condensation with the epoxy group and the bonding of the dye to the resin can be carried out by heating the dye and the colorless copolymer in a solvent such as dimethylformamide, dioxane or a ketone and heating to reflux. The progress of the condensation reaction can easily be followed by measuring the progressive disappearance of the epoxy group.

Colored polymers also usefully employed in the present invention are those formed by the simultaneous condensation of at least one alcohol and either at least one hydroxylated colorant, at least one amino colorant or a mixture of these two types of colorants on a polymer obtained by copolymerizing equimolecular quantities of maleic anhydride and an unsaturated monomer.

The alcohol and the colorant or colorants can be condensed for example on a copolymer having recurring units of the formula:

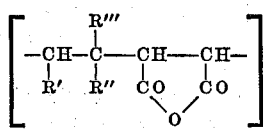
I wherein: R' and R" each independently are selected from the group consisting of hydrogen, a lower alkyl having 1–4 carbon atoms, phenyl and lower alkoxy having 1–4 carbon atoms, R''' is selected from the group consisting of hydrogen, —OCOCH$_3$, C≡N and —COOCH$_3$.

Representative of such copolymers are maleic anhydride/vinylalkyl ethers, maleic anhydride/ethylene, maleic anhydride/vinyl acetate, maleic anhydride/alkyl acrylate or alkyl methacrylate, and maleic anhydride/acrylonitrile copolymers. This list, however, is not exhaustive.

Colored polymers of this type can advantageously have the following formula:

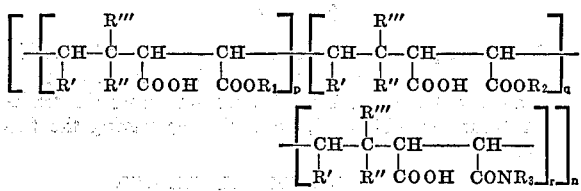

wherein:

R', R" and R''' have the meanings indicated above for formula I,

R$_1$ is a lower alkyl having 1–4 carbon atoms such as —CH$_3$, —C$_2$H$_5$, —C$_4$H$_9$, R$_2$ represents the remainder of a dye comprising a hydroxyl function, R$_3$ represents the remainder of a dye comprising a primary or secondary nuclear or extra-nuclear amino function, p, q and r represent whole numbers and either q or r may equal 0 but both cannot equal 0 simultaneously.

Representative dyes having a hydroxyl function or a primary or secondary amine function, are for example, the azo, anthraquinone, and azinic amino-triphenyl methane dyes as well as dyes derived from nitrophenylenediamines.

These colored polymers can be made by condensing the alcohol and the dye or dyes on the colorless copolymer while heating the mixture in a solvent such as dioxane or a ketone.

The order in which these substances are condensed on the copolymer can be varied.

The dye can be condensed first and then the alcohol. It is also possible to condense part of the alcohol first, then the dye, and finish up by condensing the remainder of the alcohol. The alcohol and dye can also be condensed simultaneously on the colorless copolymer. The colored copolymer is then isolated by precipitation and identified by determination of its amide-ester or amide group.

The present invention also contemplates the use of colored polymers whose macromolecular chain comprises groups to which an extra-nuclear amino dye is attached by a chemical bond of the amide type, this bond being formed by the nitrogen of the extra-nuclear amine function.

The groups in these colored polymers which form an amide bond with the extra-nuclear amino colorants can be of the following types:

Acid anhydrides having the formula:

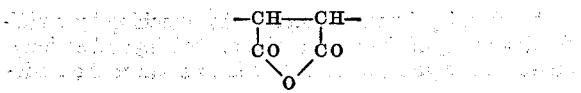

Acid halides and more particularly acid chlorides, having the formula:

Esters having the formula:

in which R represents an alkyl group having 1–4 carbon atoms.

In the examples shown above, it goes without saying that the carbons which are part of the macromolecular chain can be variously substituted.

Representative polymers which are compatible with nail polishes and which have groups on which colored polymers according to the invention can be condensed are:

(1) Polymers having the following formula:

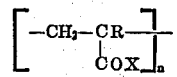

in which:

R is selected from the group consisting of hydrogen and —CH$_3$

X is a halogen such as chlorine and n is a whole number such that the molecular weight is between about 1,000 and about 10,000.

Among the polymers corresponding to the above formula, polyacrylic chloride is particularly useful and can be easily obtained by polymerizing acrylic chloride in presence of azo-bis-isobutyronitrile, which acts as a catalyst.

(2) Polymers obtained by copolymerizing equimolecular quantities of maleic anhydride and an unsaturated monomer, the resulting polymer having recurring units of the formula:

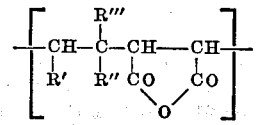

in which:

R' and R" each independently are selected from the group consisting of hydrogen, lower alkyl having 1–4 carbon atoms, phenyl and lower alkoxy having 1–4 carbon atoms, R''' is selected from the group consisting of hydrogen, —OCOCH$_3$, —C≡N and —COOCH$_3$.

(3) Polymers obtained by copolymerizing maleic anhydride and an unsaturated monomer, said polymers having undergone esterification and especially those having recurring units of the formula:

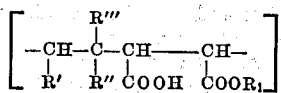

wherein:

R', R" and R''' have the above-indicated meanings, and R$_1$ represents a lower alkyl radical having 1–4 carbon atoms such as —CH$_3$, —C$_2$H$_5$ or C$_4$H$_9$.

Among the extra-nuclear amino dyes which can be used are those having the following formula:

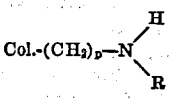

wherein:

p is 2–6,

R is selected from the group consisting of hydrogen, —CH$_3$ and —C$_2$H$_5$, and Col. represents a cyclic or polycyclic dye selected from the group consisting of azo, benzene and anthraquinone dye.

Among the dyes responding to the above definition those having one or two supplementary amine functions attached directly to their ring are particularly useful.

The preparation of these colored polymers can easily be carried out by condensing the dye or dyes on the polymers in the presence of an appropriate solvent which is inert with respect to the dyes.

The colored polymers can also be prepared by condensing the dye on monomers having reactive groups which can form an amide bond with the extra-nuclear amino dyes and then proceeding to a polymerization or copolymerization.

For instance, a copolymer in an alcoholic solution and a dye having an extra-nuclear amino radical together with a lower alkanol, such as ethanol, are placed in a flask equipped with a thermometer and a reflux condenser. The reaction mass is heated to reflux to produce said colored polymer.

The present invention also contemplates the use of colored polymers whose macromolecular chain consists of a homopolymer to which at least one amino colorant is attached by a chemical bond of the amide type.

The amino dye used to color the homopolymer can consist of an extra-nuclear amino dye in which the nitrogen of the extra-nuclear amino function is used to form the amide bond linking the dye to the homopolymer.

The extra-nuclear amino dyes having the following formula are particularly useful:

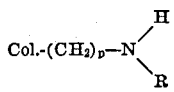

wherein:

$p$ is 2–6,

R is selected from the group consisting of hydrogen, —CH$_3$ and —C$_2$H$_5$, and Col. represents a cyclic or poly-cyclic dye selected from the group consisting of benzene and anthraquinone dye.

Among the dyes having the above formula are, for example, those having at least one other amine function substituted directly on their ring in addition to the amine function used for attachment to the polymer.

Among the homopolymers which can be used are the organic acid anhydrides having an ethylene bond such as poly(maleic anhydride), poly(itaconic anhydride), poly(acrylic anhydride), poly(methacrylic anhydride) and poly(mixed acrylic/methacrylic anhydride).

These colored polymers can be prepared by introducing the poly(organic acid anhydride), a suitable solvent such as anhydrous dioxane, the dye and a lower alkanol such as n-butanol in a flask equipped with agitating means, a thermometer and a reflux condenser. The mixture is heated to reflux and esterification can be completed, if desired, by further addition of lower alkanol and further heating to reflux. The resutling colored polymer is then precipitated by addition to the reaction mass of, for instance, petroleum ether and separated therefrom.

Still other colored polymers usefully employed in the present invention are polymeric materials obtained by polymerization of an unsaturated organic anhydride selected from the group consisting of itaconic anhydride, citraconic anhydride and acrylic anhydride with an ethylenically unsaturated monomer selected from the group consisting of maleic anhydride, vinyl acetate, isobutyl vinyl ether and methylacrylate.

Representative dyes which are reacted with the above polymers to form a colored polymer are extra-nuclear amine dyes having the formula:

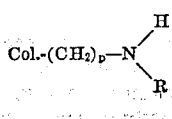

wherein:

$p$ is 2–6,

R is selected from the group consisting of hydrogen and —C$_2$H$_5$ and Col. represents a cyclic or polycyclic dye selected from the group consisting of benzene and anthraquinone dye.

Among the dyes responding to the above formula are those which, in addition to the amine function used to attach it to the polymer through an amide bond, at least one other amine function substituted directly on their rings.

In a preferred embodiment an alcohol is attached to those constituents having no coloring group and the alcohol is selected from the group consisting of butanol and ethanol.

In order that the invention can be better understood, several representative examples of colored copolymers and nail polish compositions utilizing such colored copolymers are now given.

EXAMPLES OF COPOLYMERS

Example 1

A colored polymer is prepared by attaching by amidification to 1/10 of the groups of a methylvinyl ether/butyl maleate copolymer, such as that known under the trademark "Gantrez AN 3953," a basic dye having the formula:

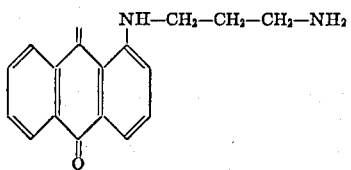

91.5 g. (0.2 mol) of an alcoholic solution containing 50.2% of the methylvinyl ether/butyl monomaleate copolymer known as "Gantrez AN 3953," are placed in a flask equipped with agitating means, a thermometer and a reflux condenser and diluted with 75 g. of ethanol 5.6 g. (0.02 mol) of the above dye are added and the mixture is heated to reflux for 23 hours.

An alcoholic solution containing 30% of a red resin is obtained.

It is found by analysis that the quantity of the dye bonded to the copolymer by amidification is 95.5% of that theoretically possible.

Example 2

A colored polymer is prepared by attaching by amidification to 1/10 of the groups of a methylvinyl ether/butyl maleate copolymer, such as that known under the trademark "Gantrez AN 3953," a basic dye having the formula:

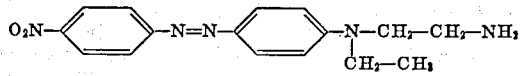

45.8 g. (0.1 mol) of an alcoholic solution containing 50% of the above "Gantrez AN 3953" resin is placed in a flask equipped with agitating means, a reflux condenser and a thermometer, and diluted with 38 g. of ethanol.

3.1 g. (0.01 mol) of dye having the above formula are added and the mixture is heated to reflux for 12 hours. An alcoholic solution containing 30% of an orange red resin is obtained.

Analysis shows that the quantity of dye combined with the polymer by amidification is 80% of that theoretically possible.

Example 3

A colored polymer is prepared by attaching by amidification to 1/10 of the groups of a methylvinyl ether/butyl maleate copolymer, such as that known under the trademark "Gantrez AN 3953," a basic dye having the formula:

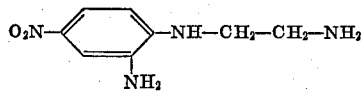

91.5 g. (0.2 mol) of an alcoholic solution containing 50% of the resin "Gantrez AN 3953" is placed in a flask equipped with agitating means, a thermometer and a reflux condenser, and diluted with 71 g. of ethanol. 3.9 g. (0.02 mol) of dye are added and the mixture heated to reflux for 8 hours.

An alcohol solution containing 30% raspberry red resin is then obtained.

Analysis shows that the quantity of dye combined with the polymer by amidification is 89% of that theoretically possible.

Example 4

A colored polymer is prepared by attaching by amidification to 1/10 of the groups of a methylvinyl ether/butyl maleate copolymer, such as that known under the trademark "Gantrez AN 3953," a basic dye having the formula:

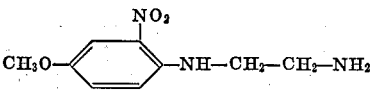

45.75 g. (0.1 mol) of an alcoholic solution containing 50.2% of "Gantrez AN 3953" is placed in a flask equipped with agitating means, a reflux condenser and a thermometer, and diluted with 36 g. of ethanol.

2.22 g. (0.01 mol) of the above dye are added and the mixture is heated to reflux for 15 hours. An alcoholic solution containing 30% of a yellow-orange resin is obtained.

It is found by analysis that the quantity of the dye bonded to the copolymer by amidification is 96.5% of that theoretically possible.

Example 5

A colored polymer is prepared by attaching by amidification to 1/10 of the groups of a methylvinyl ether/butyl maleate copolymer, such as that known under the trademark "Gantrez AN 3953," a basic dye having the formula:

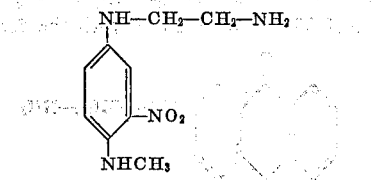

91.5 g. (0.2 mol) of a solution containing 50% of "Gantrez AN 3953" is placed in a flask equipped with agitating means, a reflux condenser and a thermometer, and diluted with 155 g. of ethanol. 4.2 g. (0.02 mol) of the above dye is added and it is heated to reflux for 8 hours. An alcoholic solution containing 20% of a violet-colored resin is obtained.

Analysis shows that the quantity of dye combined with the copolymer by amidification is 88% of that theoretically possible.

Example 6

A colored polymer is prepared by attaching by amidification to 1/10 of the groups of poly(itaconic anhydride), a basic dye having the formula:

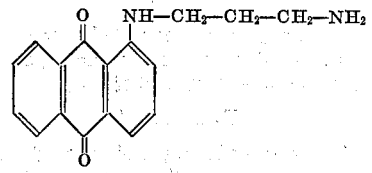

and by attaching to the rest of the groups n-butyl-alcohol.

33.6 g. (0.3 mol) of poly(itaconic anhydride), 200 g. of anhydrous dioxane, 4.2 g. (0.015 mol) of dye having the above formula and 21 g. (0.285 mol) of n-butanol are placed in a flask equipped with agitating means, a thermometer and a reflux condenser. The mixture is heated to reflux for 15 hours. The esterification is completed by addition of 22.2 g. (0.3 mol-g.) of n-butanol and it is again heated to reflux for 7 hours.

The colored copolymer is then precipitated with petroleum ether. Drying yields 79.5% by weight of a red powder, which is soluble in alcohol and in a hydroalcoholic mixture.

It is found by analysis that 100% of the theoretically possible quantity of dye is bonded to the polymer by amidification.

Poly(itaconic anhydride) is replaced with essentially comparable molar amounts of poly(maleic anhydride), poly(acrylic anhydride), poly(methacrylic anhydride) and poly(acrylic/methacrylic) anhydride to produce comparable polymers on which the above dye can be condensed.

Additionally, the other similar azo, anthraquinone and benzene dyes utilized in the preceding and succeeding examples are also used with substantially comparable effectiveness.

Example 7

A colored polymer is prepared by attaching by amidification to 1/10 of the groups of a methyl methacrylate/maleic anhydride copolymer, a basic dye having the formula:

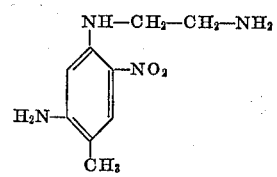

and by attaching to the rest of the groups n-butyl alcohol.

150 cc. of dioxane, 34 g. (0.1 mol) of methyl methacrylate/maleic anhydride copolymer having an anhydride index of 331 (which corresponds to a copolymer containing 29% maleic anhydride and 71% methyl methacrylate), 6.66 g. (0.09 mol) of n-butanol and 2.1 g. (0.01 mol) of the above dye are placed in a flask equipped with agitating means, a thermometer and a condenser.

The mixture is heated to reflux for 16 hours. Then the esterification is completed by adding 7.4 g. (0.1 mol) of n-butanol and it is again heated to reflux for 8 hours.

After condensation, the colored polymer is precipitated with petroleum ether. After drying, a yellow powder is obtained. The yield is 85% by weight, and this powder is soluble in alcohol and in a water-alcohol mixture in its neutralized form.

Analysis shows that the quantity of dye combined with the polymer by amidification is 83% of that theoretically possible.

Example 8

A colored polymer is prepared by attaching by amidification to 1/10 of the groups of an ethylene/maleic anhydride copolymer a basic dye having the formula:

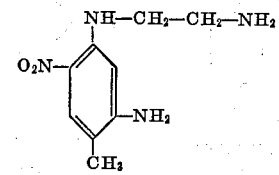

and by attaching to the rest of the groups n-butyl alcohol.

150 ml. of anhydrous dioxane, 28.6 g. (0.2 mol) of ethylene/maleic anhydride copolymer known under the trademark "DX 840-11" having an ethylene/maleic anhydride ratio of about 1:1 and a viscosity of 0.1 (1% solution of the copolymer in DMF at 25° C.), 13.3 g. (0.18 mol) of n-butanol and 4.2 g. (0.02 mol) of the above dye are placed in a flask equipped with agitating means, a reflux condenser and a thermometer.

It is heated to reflux for 15 hours. The esterification is completed by the addition of 14.8 g. (0.2 mol) of n-butanol and the mixture is again heated to reflux for 8 hours.

After reaction, the colored copolymer is precipitated with ethyl ether. After drying, a yellow powder is obtained. The yield is 80% by weight. 90% of the dye is bonded to the copolymer.

Example 9

A colored polymer is prepared by attaching by condensation to 1/10 of the groups of a methylvinyl ether/maleic anhydride copolymer known under the trademark "Gantrez AN 119," a basic dye having the formula:

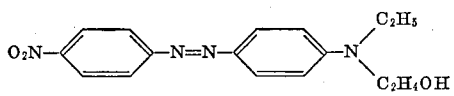

and by attaching to the rest of the groups n-butyl alcohol.

150 ml. of methylisobutyl ketone, 12.3 g. (0.04 mol) of the above dye, 13.3 g. (0.18 mol) of n-butanol and 30 g. (0.2 mol) of the above methylvinyl ether/maleic anhydride copolymer are introduced into a flask provided with agitating means, a thermometer, and a reflux condenser.

The mixture is kept at reflux for 16 hours. Esterification is completed by adding 15 grams (0.2 mol) of n-butanol and then heating the mixture to reflux for another 8 hours.

At the end of the reaction, the colored copolymer is precipitated by adding ether and the uncombined dye is extracted.

After drying a 68% yield by weight of a red powder is obtained, which after neutralization, is soluble in alcohol and in a hydro-alcoholic solution.

Example 10

A colored polymer is prepared by copolymerization of a colored monomer, 1-N-(acryloylaminopropyl)-amino anthraquinone, with vinylpyrrolidone.

47.5 g. of vinylpyrrolidone, 2.5 g. of 1-N-(acryloylaminopropyl)-amino-anthraquinone, obtained by condensing acrylyl chloride on the dye, N-(1-aminoanthraquinone), and 0.5 g. of azobisisobutyronitrile in solution in 150 ml. of anhydrous dioxane are placed in a flask equipped with agitating means, a thermometer, a reflux condenser and a tube for introducing nitrogen. The mixture is heated to reflux. After 7 hours of heating, the polymerization is terminated. The colored copolymer in solution is precipitated with ethyl ether.

A resin is obtained which, after drying, yields 64% by weight of a red powder.

It is found by analysis that the resulting colored copolymer is a 95% vinylpyrrolidone-5% 1-N-(acryloylaminopropyl)-amino anthraquinone copolymer.

Example 11

A colored polymer is prepared by quaternization of a 70% vinyl acetate/20% vinylpyrrolidone/10% N-allyl-chloracetanide copolymer with a dye having the formula:

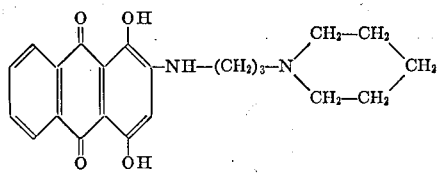

The above monomers are introduced into a flask provided with an agitator, a reflux condenser, a thermometer, and a tube for admitting nitrogen, in the following amounts:

|   | G. |
|---|---|
| Vinylacetate | 70 |
| Vinylpyrrolidone | 20 |
| N-allyl-chloracetamide | 10 |

220 g. of absolute ethyl alcohol and 5 g. of diazo-isobutyronitrile are added and the mixture heated to reflux for 20 hours. After cooling, ether is used to precipitate the copolymer with a 75% yield resulting.

The thus powdered copolymer is quaternized with the above dye by introducing 23.3 g. of said copolymer and 5.70 g. of 1,4-dihydroxy-(γ-piperidino-propyl)-2-amino anthraquinone into a flask provided with agitating means and a reflux condenser. 90 cc. of dioxane are added and the mixture is brought to reflux. After 16 hours, the colored copolymer is precipitated with ether. A yield of 65% by weight of a cyclamen red powder is obtained, the percentage of quaternization being 94%.

Example 12

A colored polymer semi-ester-semi-amide mixture is prepared by condensation on a methylvinylether/butylmaleate copolymer known under the trademark "Gantrez AN 3953," of the dye with the formula:

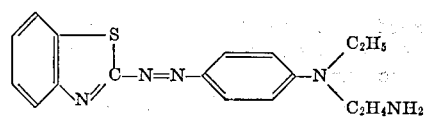

by proceeding in the following manner:

There is placed in a flask supplied with an agitator and a reflux refrigerant thermometer, 101 g. of an alcohol solution containing 45.5% of "Gantrez AN 3953" (0.2 mol.g.) which is diluted by the addition of 67.5 g. of ethanol.

There is added 6.5 g. (0.02 mol.g.) of dye whose formula is indicated above and which is heated at reflux for 30 hours.

An alcoholic solution containing 30% red dyed resin is thus obtained..

The result of the tests made is a fixation of the dye of 62% with respect to the possible theoretical quantities.

The colored resin obtained is then separated from the solution which also contains the dye not having taken part in the amidification reaction. For that reason, there is added some ether in order to precipitate the dyed resin which is then washed and dried.

Example 13

A colored copolymer is prepared by condensing methylvinylether-butylmaleate, known under the trademark "Gantrez AN 3953," with a dye with the formula:

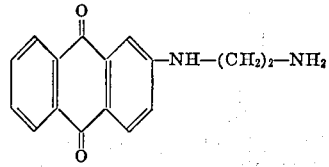

by acting in the following manner:

There is placed in a flask supplied with an agitator, a reflux refrigerant thermometer, 50.5 g. of an alcoholic solution containing 45.5% of "Gantrez AN 3953" (0.1 mol.g.) which is diluted by the addition of 52.8 g. of ethanol.

There is then added 2.7 g. (0.01 mol.g.) of a dye whose formula is indicated above and which is heated at reflux for 32 hours.

An alcoholic solution containing 24.5% yellow-orange dyed resin is thus obtained.

It is determined from tests made that the yield of fixation of the dye is 96% with respect to the theoretically possible quantity.

The dyed resin is next separated from the solution which contains the dye not having participated in the reaction by precipitating it by use of ether.

Example 14

A colored copolymer is prepared by condensing n-butyl alcohol and a dye having the following formula on a methylvinyl ether/maleic anhydride copolymer known under the trademark "Gantrez 119":

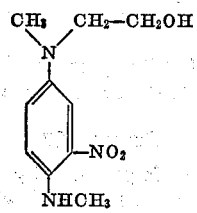

150 ml. of methylisobutylketone, 13.3 g. (0.18 mols) of n-butanol, 4.5 g. (0.02 mols) of the above dye, and 30 g. (0.2 mols) of the copolymer of methylvinyl ether and maleic anhydride are introduced into a flask provided with agitating means, a thermometer and a condenser.

The mixture is brought to reflux for 16 hours. The esterification is completed by adding 15 g. (0.2 mols) of n-butanol and heating to reflux for an additional 8 hours.

After the reaction is over, the colored copolymer is precipitated with ether and the uncombined dye extracted.

After drying, the result is a yield of 85% by weight of a violet powder which, after neutralization, is soluble in alcohol and in a hydro-alcoholic mixture.

Analyses have shown that 40% of the theoretically indicated quantity of dye is combined.

Example 15

A colored copolymer is prepared by condensing n-butyl alcohol and a dye having the following formula on a copolymer of methylvinyl ether and maleic anhydride known under the trademark "Gantrez 119":

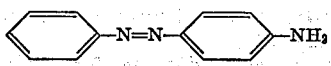

150 ml. of methlisobutylketone, 13.3 g. (0.18 mols) of n-butanol, 4 g. (0.02 mols) of the above dye and 30 g. (0.2 mols) of the methylvinyl ether/maleic anhydride copolymer are introduced into a flask provided with agitating means, a thermometer and a condenser.

The mixture is heated to reflux for 16 hours. Esterification is completed by adding 15 g. (0.2 mols) of n-butanol and heating to reflux for another 8 hours.

At the end of the reaction, the colored copolymer is precipitated by using ether and the uncombined dye is extracted.

After drying, the result is a yield of 89% by weight of a yellow-orange powder which, after neutralization is soluble in alcohol and in a hydro-alcoholic mixture.

Analyses indicated that 86% of the theoretically predicted quantity of dye is combined.

Example 16

A colored copolymer is prepared by condensation of n-butyl alcohol and a dye having the following formula on a methylvinyl ether/maleic anhydride copolymer known under the trademark "Gantrez 119":

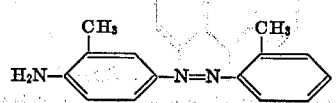

150 ml. of methylisobutylketone, 13.3 g. (0.18 mols) of n-butanol, 4.25 g. (0.02 mols) of the above dye, and 30 g. of the methylvinyl ether/maleic anhydride copolymer are introduced into a flask provided with agitating means, a thermometer and a reflux condenser.

The mixture is heated to reflux for 16 hours. Esterification is then completed by adding 15 g. (0.2 mols) of n-butanol and heating for another 8 hours. The colored copolymer is precipitated at the end of the reaction and the uncombined dye is extracted.

After drying, the result is an 88% yield by weight of a yellow-orange powder which after neutralization is soluble in alcohol and in a hydro-alcoholic mixture.

Analyses shows that 82% of the theoretically predicted quantity of dye is combined.

Example 17

A colored copolymer is prepared by condensing n-butyl alcohol and a dye having the following formula on a copolymer of methylvinyl ether and maleic anhydride known under the trademark "Gantrez 119":

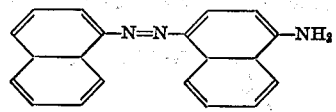

100 ml. of methylisobutylketone, 6.65 g. (0.09 mols) of n-butanol, 3 g. (0.1 mols) of the above dye, and 15 g. (0.01 mols) of the copolymer of methylvinyl ether and maleic anhydride are introduced into a flask provided with agitating means, a thermometer, and a reflux condenser.

The mixture is heated to reflux for 20 hours. Esterification is then completed by adding 7.5 g. (0.1 mols) of n-butanol and heating for another 8 hours.

At the end of the reaction the colored copolymer is precipitated with ether and the uncombined dye is extracted.

After drying, the result is a yield of 87% by weight of a brown powder which, after neutralization, is soluble in alcohol and in a hydro-alcoholic mixture.

Analyses shows that 77% of the theoretically predicted quantity of dye is combined.

Example 18

A colored copolymer is prepared by condensing on a methylvinylether/butyl monomaleate copolymer known under the trademark "Gantrez AN 3953," a dye having the formula:

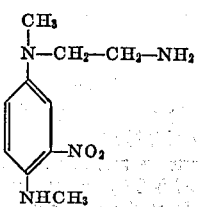

87 g. (0.2 mol) of an alcoholic solution containing 53.5% of "Grantrez AN 3953" are placed in a flask equipped with agitating means, a thermometer and a reflux condenser, and diluted with 90 g. of ethanol.

4.5 g. (0.02 mol) of the dye having the above formula are added and it is heated to reflux for 9 hours.

After this time, an alcoholic solution containing 27% of a violine-colored resin is obtained.

Analyses shows that the quantity of dye bonded to the polymer by amidification is 86% of that thoretically possible.

Example 19

A colored copolymer is prepared by condensing on a methylvinylether/butyl monomaleate copolymer known under the trademark "Gantrez AN 3953," a dye having the formula:

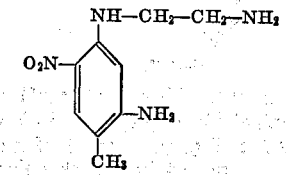

91.5 g. (0.2 mol) of an alcoholic solution containing 50% of "Gantrez AN 3953" are placed in a flask equipped with agitating means, a reflux condenser and a thermometer, and diluted with 155 g. of ethanol.

4.2 g. (0.02 mol) of the dye having the above formula are added and the mixture heated to reflux for 7½ hours. An alcoholic solution containing 20% of a lemon-yellow resin is obtained.

Analyses shows that the quantity of dye combined with the polymer by amidification is 84% of that thoretically possible.

Example 20

A colored copolymer is prepared by condensing on a methylvinylether/butyl monomaleate copolymer known under the trademark "Gantrez AN 3953," a dye having the formula:

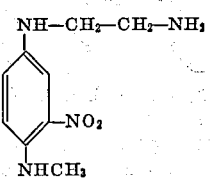

91.5 g. (0.2 mol) of a solution containing 50% of the "Gantrez AN 3953" are placed in a flask equipped with agitating means, a reflux condenser and a thermometer and diluted with 155 g. of alcohol. 4.2 g. (0.02 mol) of the above dye are added and the mixture is heated to reflux for 8 hours. An alcoholic solution containing 20% of a violet-colored resin is obtained.

Analyses shows that the quantity of dye combined with the copolymer by amidification is 88% of that theoretically possible.

Example 21

A colored copolymer is prepared by condensing on a methylvinylether/butyl monomaleate copolymer known under the trademark "Gantrez AN 3953" dye having the formula:

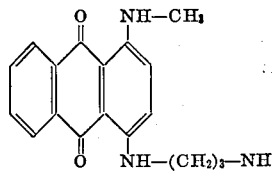

45.75 g. (0.1 mol) of an alcoholic solution containing 50% of "Gantrez AN 3953" are placed in a flask equipped with agitating means, a reflux condenser and a thermometer and diluted with 82 g. of ethanol.

3.09 g. (0.01 mol) of the dye having the above formula are added and the mixture heated to reflux for 13 hours. An alcoholic solution containing 20% of a blue resin is obtained.

Analysis shows that the quantity of dye combined with the polymer by amidification is 88% of that theoretically possible.

Example 22

A colored copolymer is prepared by condensing on a methylvinyl ether/maleic anhydride copolymer known under the trademark "Gantrez 119" n-butyl alcohol and a dye having the formula:

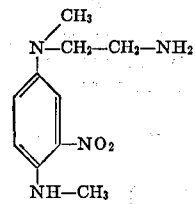

350 ml. of dioxane, 30 g. (0.2 mol) of methylvinyl ether/maleic anhydride copolymer, 13.3 g. (0.18 mol) of n-butanol and 4.48 g. (0.02 mol) of a dye having the above formula are placed in a flask eqiupped with agitating means, a thermometer and a condenser.

The resulting mixture is heated to reflux for 9 hours. Esterification is completed by the addition of 15 g. (0.2 mol) of n-butanol, the mixture again being heated to reflux for 8 hours.

After reaction, the colored copolymer is precipitated with petroleum ether. After drying, a yield of 89% by weight of a violent powder is obtained. This powder is soluble in alcohol and in a neutralized water-alcohol mixture.

Analysis shows that the quantity of dye bonded to the copolymer by amidification is 84.5% of that theoretically possible.

Example 23

A colored polymer is prepared by condensing n-butyl alcohol and a dye having the following formula, on a 50% maleic anhydride/50% itaconic anhydride copolymer:

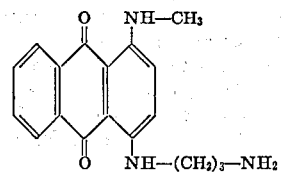

The following materials are introduced into a one-liter flask equipped with agitating means, a thermometer, a dropping funnel and a tube for introducing nitrogen:

Maleic anhydride _____ g__ 60
Itaconic anhydride _____ g__ 60
Distilled benzene _____ cc__ 300

This mixture is heated to reflux and a solution containing 24 g. of benzoyl peroxide in 200 cc. of benzene is introduced drop by drop over a 24 hour period.

The resulting copolymer is dried and washed with pentane, and again dried. The end product is a white powder.

The yield of the reaction by weight is 85% and the anhydride index of the end product is 991.4, the theoretical index being 1072.

75 cc. of anhydrous dimethyl formamide, 22.6 g. of the above maleic anhydride/itaconic anhydride copolymer, 6.18 g. (0.02 mol) of the above dye and 13.2 g. (0.18 mol) of n-butanol are introduced into a flask provided with agitating means, a thermometer and a reflux condenser. This mixture is heated at reflux for 16 hours. Esterification is completed by adding 14.6 g. (0.2 mol) of n-butanol and again heating to reflux for 7 hours.

The reaction mixture is then diluted with an equal volume of dioxane and the colored polymer is precipitated with ether. After drying, the yield is 60% by weight of a deep violet powder.

Tests show that 95% of the dye has been bonded to the polymer by amidification.

Example 24

A colored copolymer is prepared by condensing n-butyl alcohol and a dye having the following formula on a vinyl acetate/citraconic acid copolymer:

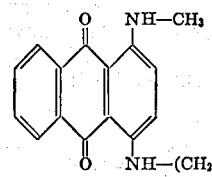

The following materials are introduced into a one-liter flask provided with agitating means, a reflux condenser, a thermometer, and a tube for introducing nitrogen.

Vinyl acetate _____ g__ 50
Citraconic anhydride _____ g__ 50
Distilled toluene _____ cc__ 233
Benzoyl peroxide _____ g__ 5.882

This mixture is brought to reflux while stirring under a nitrogen atmosphere. The copolymer precipitates in the toluene. The process is stopped after 8 hours.

The resulting polymer is dried, washed with petroleum ether, and again dried.

The copolymer is in the form of a powder.

The yield of the reaction by weight is 85% and the anhydride index of the end product is 563.5.

105 cc. of distilled dioxane, 40 g. of the above vinyl acetate/citraconic acid copolymer, 13.3 g. (0.18 mols) of n-butanol, and 6,18 g. (0.02 mols) of the above dye are introduced into a flask provided with agitating means, a thermometer, and a condenser.

This mixture is heated at reflux for 16 hours. Esterification is completed by adding 15 g. (0.2 mols) of n-butanol and heating again at reflux for 7 hours.

After reaction, the colored copolymer is precipitated with dry ether. After drying the yield is 86% by weight of a deep blue powder.

Analysis shows that 89.6% of the dye has been bonded to the copolymer by amidification.

In the above examples, Gantrez AN 119 has a specific viscosity of 0.1–0.5 in a 1% solution of the copolymer in methyl ethyl ketone at 25° C., and Gantrez AN 3953 is the half butyl ester thereof.

EXAMPLES OF NAIL POLISH COMPOSITIONS

Example 25

A nail polish having the following composition is prepared:

| | G. |
|---|---|
| Nitrocellulose | 15 |
| Santolite MHP | 7.5 |
| Camphor | 2.5 |
| Dibutylphthalate | 5 |
| Colored polymer of Example 1 | 3 |
| Acetone | 5 |
| Ethyl acetate | 15 |
| Butyl acetate | 25 |
| Butanol | 4 |
| Xylene | 18 |

A transparent red nail polish is obtained which is exceptionally brilliant and which does not stain the nails.

Example 26

A nail polish having the following composition is prepared:

| | G. |
|---|---|
| Nitrocellulose | 14 |
| Santolite MHP | 8 |
| Dibutylphthalate | 5 |
| Colored polymer of Example 1 | 2 |
| Colored polymer of Example 2 | 1.5 |
| Methyl acetate | 6 |
| Ethyl acetate | 10 |
| Butyl acetate | 18 |
| Butanol | 3.5 |
| Toluene | 29 |
| TiO$_2$ | 3 |

A red-orange cream nail polish is obtained which is of exceptional brilliance and which does not stain the nails.

Example 27

A nail polish having the following composition is prepared:

| | G. |
|---|---|
| Nitrocellulose | 14 |
| Santolite MHP | 8 |
| Dibutylphthalate | 5 |
| Colored polymer of Example 4 | 1.5 |
| Colored polymer of Example 3 | 0.5 |
| Acetone | 10 |
| Ethyl acetate | 18 |
| Butyl acetate | 20 |
| Butanol | 4 |
| Nacreous product sold under the trademark "Mearlmaid" | 6 |
| Xylene | 13 |

A nacreous orange polish of exceptional brilliance is obtained which does not stain the nails.

Example 28

A nail polish having the following composition is prepared:

| | G. |
|---|---|
| Nitrocellulose | 15 |
| Santolite MHP | 8 |
| Colored polymer of Example 1 | 3.5 |
| Dibutyl phthalate | 7 |
| Ethyl alcohol | 3.5 |
| Acetone | 5 |
| Butanol | 3.5 |
| Ethyl acetate | 14 |
| Butyl acetate | 24.5 |
| Toluene | 16 |

A transparent red nail polish is obtained which is exceptionally brilliant and which does not stain the nails.

Example 29

A nail polish having the following composition is prepared:

| | G. |
|---|---|
| Nitrocellulose | 13 |
| Santolite MHP | 8 |
| Colored copolymer of Example 6 | 3 |
| Dibutylphthalate | 6 |
| Absolute ethyl alcohol | 4 |
| Butanol | 3 |
| Ethyl acetate | 16 |
| Butyl acetate | 20 |
| Toluene | 27 |

A red nail polish of exceptional brilliance is obtained, which adheres perfectly and which does not stain the nails.

Example 30

A nail polish having the following composition is prepared:

| | G. |
|---|---|
| Nitrocellulose | 14 |
| Santolite MHP | 7 |
| Colored copolymer of Example 4 | 2 |
| Colored copolymer of Example 5 | 1 |
| Dibutyl phthalate | 6 |
| Ethyl acetate | 20 |
| Butyl acetate | 25 |
| Butyl alcohol | 7 |
| Xylene | 18 |

A transparent red-orange nail polish which adheres perfectly is obtained. It is exceptionally brilliant and does not stain the nails.

Example 31

A nail polish having the following composition is prepared:

| | G. |
|---|---|
| Nitrocellulose | 14 |
| Santolite MHP | 9 |
| Colored polymer of Example 7 | 4 |
| Dibutylphthalate | 7 |
| Absolute ethyl alcohol | 4 |
| Butanol | 4 |
| Ethyl acetate | 17 |
| Butyl acetate | 20 |
| Toluene | 21 |

A highly transparent nail polish of an unusual yellow shade is obtained which adheres perfectly and which does not stain the nails.

Example 32

A nail polish having the following composition is prepared:

| | G. |
|---|---|
| Nitrocellulose | 12 |
| Santolite MHP | 8 |
| Colored polymer of Example 8 | 3 |
| Dibutylphthalate | 7 |
| Absolute ethyl alcohol | 4 |
| Butanol | 3 |
| Ethyl acetate | 18 |
| Butyl acetate | 20 |
| Toluene | 25 |

A yellow nail polish is obtained which does not stain the nails.

Example 33

A nail polish having the following composition is prepared:

| | G. |
|---|---|
| Nitrocellulose | 13 |
| Santolite MHP | 7 |
| Colored polymer of Example 9 | 4 |
| Dibutylphthalate | 6 |
| Absolute ethyl alcohol | 3 |
| Butanol | 4 |
| Ethyl acetate | 18 |
| Butyl acetate | 20 |
| Toluene | 25 |

A red nail polish of high transparency is obtained which does not stain the nails.

Example 34

A nail polish having the following composition is prepared:

| | G. |
|---|---|
| Nitrocellulose | 13 |
| Santolite MHP | 7 |
| Colored polymer of Example 10 | 4 |
| Dibutylphthalate | 6 |
| Absolute ethyl alcohol | 4 |
| Butanol | 3 |
| Ethyl acetate | 18 |
| Butyl acetate | 20 |
| Toluene | 22 |
| Titanium dioxide | 3 |

A red cream nail polish of exceptional brilliance is obtained, which does not stain the nails.

Example 35

A nail polish having the following composition is prepared:

| | G. |
|---|---|
| Nitrocellulose | 12 |
| Santolite MHP | 8 |
| Colored polymer of Example 11 | 3 |
| Dibutylphthalate | 7 |
| Absolute ethyl alcohol | 4 |
| Butanol | 3 |
| Ethyl acetate | 18 |
| Butyl acetate | 18 |
| Toluene | 20 |
| Essence of the Orient | 7 |

A cyclamen red nail polish is obtained which does not stain the nails.

Example 36

There is produced a nail polish having the following composition:

| | G. |
|---|---|
| Nitrocellulose | 15 |
| Santolite MHP | 10.5 |
| Dibutyl phthalate | 6.5 |
| Camphor | 0.5 |
| Colored polymer obtained according to Example 12 (with 100% of active material) | 3.75 |
| Ethyl alcohol | 10 |
| Ethyl acetate | 15 |
| Butyl acetate | 15.5 |
| Butanol | 3.25 |
| Toluene | 20 |

An adhering transparent red nail polish is obtained which does not stain the nails.

Example 37

| | G. |
|---|---|
| Nitrocellulose | 15 |
| Santolite MHP | 10.5 |
| Dibutyl phthalate | 6.5 |
| Camphor | 0.5 |
| Colored polymer obtained according to Example 13 | 3.75 |
| Ethyl alcohol | 10 |
| Ethyl acetate | 15 |
| Butyl acetate | 15.5 |
| Butanol | 3.25 |
| Toluene | 20 |

This produces an adhering and transparent orange colored nail polish which has exceptional brilliance and which does not stain the nails.

Example 38

A nail polish having the following composition is prepared:

| | G. |
|---|---|
| Nitrocellulose | 12 |
| Santolite MHP | 8.5 |
| Colored polymer of Example 23 | 2.5 |
| Dibutyl phthalate | 4 |
| Camphor | 2 |
| Ethyl acetate | 11 |
| Butyl acetate | 26 |
| Absolute ethyl alcohol | 10 |
| Butyl alcohol | 3 |
| Toluene | 21 |

A transparent red nail polish is obtained which does not stain the nails.

Example 39

A fingernail polish having the following composition is prepared:

| | G. |
|---|---|
| Nitrocellulose | 12 |
| Santolite MHP | 8.5 |
| Colored polymer of Example 24 | 2.5 |
| Dibutyl phthalate | 4 |
| Camphor | 2 |
| Ethyl acetate | 11 |
| Butyl acetate | 26 |
| Absolute ethyl alcohol | 10 |
| Butyl alcohol | 3 |
| Toluene | 21 |

A translucent yellow nail polish is obtained which does not stain the nails.

Example 27 is repeated, using however, essentially an equal amount of the colored polymers of Examples 14–22, rather than the colored polymer of Example 1. Equally favorable results are achieved, the nail polish produced in each instance being characterized by the fact that it does not, even after repeated applications, stain the nails.

What is claimed is:

1. A transparent nail polish composition consisting essentially of a solution of 12–15% by weight of a nitrocellulose film former,
   6–13% by weight of an aryl sulfonamide formaldehyde resin,
   5–8% by weight of a plasticizer selected from the group consisting of dibutyl phthalate, camphor and their mixtures,
   1–15% by weight of a coupler selected from the group consisting of ethanol, butanol, n-propanol, isopropanol and their mixtures,
   12–32% by weight of a diluent selected from the group consisting of xylene, toluene and their mixtures, and
   0.5–6% by weight of a soluble colored polymer consisting essentially of recurring units of the formula

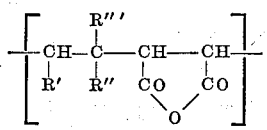

wherein R' and R'' each independently are selected from the group consisting of hydrogen, lower alkyl having 1–4 carbon atoms, phenyl and lower alkoxy having 1–4 carbon atoms, R''' is selected from the group consisting of hydrogen, —OCOCH$_3$, —C≡N and —COOCH$_3$, having condensed on the anhydride function thereof (1) a dye selected from the group consisting of azo, anthraquinone and benzene dyes containing an extra nuclear radical having the formula

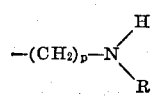

wherein $p$ is 2–6, and R is selected from the group consisting of hydrogen, —CH$_3$ and —C$_2$H$_5$, said extra nuclear radical being bonded to the aromatic nucleus of said dye through a nitrogen atom directly attached to said aromatic nucleus and said dye being bonded to said recurring units by an amide bond through the terminal nitrogen atom of said extra nuclear radical and (2) n-butyl alcohol, the remainder of said composition being essentially a solvent selected from the group consisting of acetone, ethyl acetate, butyl acetate, methyl acetate and mixtures thereof.

2. The nail polish composition of claim 1 which also includes 1–3 weight percent of titanium dioxide.

3. A transparent nail polish composition consisting essentially of a solution of 12–15% by weight of a nitrocellulose film former,
   6–13% by weight of an aryl sulfonamide formaldehyde resin,
   5–8% by weight of a plasticizer selected from the group consisting of dibutyl phthalate, camphor and their mixtures,
   1–15% by weight of a coupler selected from the group consisting of ethanol, butanol, n-propanol, isopropanol and their mixtures,
   12–32% by weight of a diluent selected from the group consisting of xylene, toluene and their mixtures, and
   0.5–6% by weight of a soluble colored polymer consisting essentially of recurring units of the formula

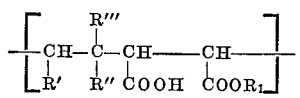

wherein R' and R'' each independently represent a member selected from the group consisting of hydrogen, lower alkyl having 1–4 carbon atoms, phenol and lower alkoxy having 1–4 carbon atoms, R''' is selected from the group consisting of hydrogen, —OCOCH$_3$, —C≡N and —COOCH$_3$ and R$_1$ represents lower alkyl having 1–4 carbon atoms, said polymer having condensed thereon a dye selected from the group consisting of aromatic azo, benzene and anthraquinone dyes containing an extra nuclear radical of the formula

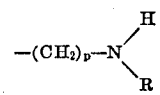

wherein $p$ is 2–6 and R is selected from the group consisting of hydrogen, —CH$_3$ and —C$_2$H$_5$, said extra nuclear radical being bonded to the aromatic nucleus of said dye through a nitrogen atom directly attached to said aromatic nucleus and said dye being bonded to said recurring units by an amide bond through the terminal nitrogen atom of said extra nuclear radical, the remainder of said composition being essentially a solvent selected from the group consisting of acetone, ethyl acetate, butyl acetate, methyl acetate and mixtures thereof.

4. The nail polish composition of claim 3 which also includes 1–3 weight percent of titanium dioxide.

5. A transparent nail polish composition consisting essentially of a solution of 12–15% by weight of a nitrocellulose film former,
   6–13% by weight of an aryl sulfonamide formaldehyde resin,
   5–8% by weight of a plasticizer selected from the group consisting of dibutyl phthalate, camphor and their mixtures,
   1–15% by weight of a coupler selected from the group consisting of ethanol, butanol, n-propanol, isopropanol and their mixtures,
   12–32% by weight of a diluent selected from the group consisting of xylene, toluene and their mixtures, and
   0.5–6% by weight of a soluble colored polymer consisting essentially of recurring units of the formula:

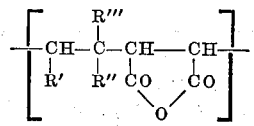

wherein R' and R'' each independently are selected from the group consisting of hydrogen, lower alkyl having 1–4 carbon atoms, phenyl and lower alkoxy having 1–4 carbon atoms, R''' is selected from the group consisting of hydrogen, —OCOCH$_3$, —C≡N and —COOCH$_3$ the anhydride function of which is condensed with a dye selected from the group consisting of aromatic azo, anthraquinone and benzene dyes having directly attached to the aromatic nucleus thereof a substituent selected from the group consisting of amino and hydroxy alkylamino, the alkyl moiety of which has 2 to 4 carbon atoms, said dye being bonded to said recurring units through said substituent, the remainder of said composition being essentially a solvent selected from the group consisting of acetone, ethyl acetate, butyl acetate, methyl acetate and mixtures thereof.

6. The nail polish composition of claim 5 which also includes 1–3 weight percent of titanium dioxide.

7. A transparent nail polish composition consisting essentially of a solution of 12–15% by weight of a nitrocellulose film former,
   6–13% by weight of an aryl sulfonamide formaldehyde resin,
   5–8% by weight of a plasticizer selected from the group consisting of dibutyl phthalate, camphor and their mixtures,
   1–15% by weight of a coupler selected from the group consisting of ethanol, butanol, n-propanol, isopropanol and their mixtures,
   12–32% by weight of a diluent selected from the group consisting of xylene, toluene and their mixtures, and
   0.5–6% by weight of a soluble colored polymer comprising a poly(organic acid anhydride) selected from the group consisting of poly(itaconic anhydride), poly-(maleic anhydride), poly(methacrylic anhydride), poly(acrylic anhydride) and poly(acrylic-methacrylic anhydride) having condensed thereon (1) a dye selected from the group consisting of aromatic azo, anthraquinone and benzene dyes containing an extra nuclear radical having the formula

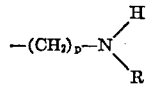

wherein $p$ is 2–6 and R is selected from the group consisting of hydrogen, —$CH_3$ and —$C_2H_5$, and (2) n-butyl alcohol, said extra nuclear radical being bonded to the aromatic nucleus of said dye through a nitrogen atom directly attached to said aromatic nucleus and said dye being bonded to the anhydride function of said poly(organic acid anhydride) by an amide bond through the terminal nitrogen atom of said extra nuclear radical, acid n-butyl alcohol being condensed on another anhydride function of said poly(organic acid anhydride), the remainder of said composition being essentially a solvent selected from the group consisting of acetone, ethyl acetate, butyl acetate, methyl acetate and mixtures thereof.

8. The nail polish composition of claim 7 which also includes 1–3 weight percent of titanium dioxide.

9. A transparent nail polish composition consisting essentially of a solution of 12–15% by weight of a nitrocellulose film former,
   6–13% by weight of an aryl sulfonamide formaldehyde resin,
   5–8% by weight of a plasticizer selected from the group consisting of dibutyl phthalate, camphor and their mixtures,
   1–15% by weight of a coupler selected from the group consisting of ethanol, butanol, n-propanol, isopropanol and their mixtures,
   12–32% by weight of a diluent selected from the group consisting of xylene, toluene and their mixtures, and
   0.5–6% by weight of a soluble colored polymer formed from an unsaturated organic anhydride selected from the group consisting of itaconic anhydride, citraconic anhydride and acrylic anhydride, and an ethylenically unsaturated monomer selected from the group consisting of maleic anhydride, vinyl acetate, isobutyl vinyl ether and methyl acrylate, having condensed on the anhydride function thereof (1) a dye selected from the group consisting of benzene and anthraquinone dyes containing an extra nuclear radical having the formula

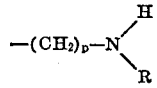

wherein $p$ is 2–6, and R is selected from the group consisting of hydrogen, —$CH_3$ and —$C_2H_5$, said extra nuclear radical being bonded to the aromatic nucleus of said dye through a nitrogen atom directly attached to said aromatic nucleus and said dye being bonded to the polymer through an amide bond through the terminal nitrogen atom of said extra nuclear radical and (2) n-butyl alcohol, the remainder of said composition being essentially a solvent selected from the group consisting of acetone, ethyl acetate, butyl acetate, methyl acetate and mixtures thereof.

10. The nail polish composition of claim 9 which also includes 1–3 weight percent of titanium dioxide.

11. A transparent nail polish composition consisting essentially of a solution of a film former, a resin, a plasticizer, a coupler, a diluent, a solvent and a coloring agent, said coloring agent being a soluble colored polymer consisting essentially of 10 weight percent N-allyl-chloroacetamide, 20 weight percent vinyl pyrrolidone and 70 weight percent vinyl acetate and a dye having the formula

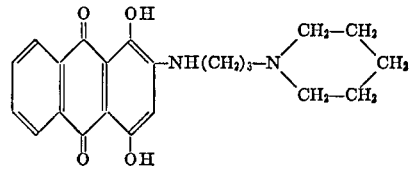

said colored polymer being present in amounts of 0.5–6% by weight of said composition, said film former being nitrocellulose present in amounts of 12–15% by weight of said composition, said resin being aryl sulfonamide formaldehyde resin present in amounts of 6–13% by weight of said composition, said plasticizer being selected from the group consisting of dibutyl phthalate, camphor and their mixtures and being present in amounts of 5–8% by weight of said composition, said coupler being selected from the group consisting of ethanol, butanol, n-propanol, isopropanol and their mixtures and being present in amounts of 1–15% by weight of said composition, said diluent being selected from the group consisting of xylene, toluene and their mixtures and being present in amounts of 12–32% by weight of said compositoin, and the remainder being essentially said solvent which is selected from the group consisting of acetone, ethyl acetate, butyl acetate, methyl acetate and their mixtures.

12. The nail polish composition of claim 11 containing 1–3 weight percent of titanium dioxide.

References Cited

UNITED STATES PATENTS

| | | | |
|---|---|---|---|
| 3,597,468 | 8/1971 | Kalopissis et al. | 8—10.1 |
| 3,073,794 | 1/1963 | Stoner | 424—61 X |
| 3,132,133 | 5/1964 | Randall | 260—41 C X |
| 3,216,948 | 11/1965 | Redding | 260—41 C X |
| 3,251,743 | 5/1966 | Hahn et al. | 260—41 C X |
| 3,342,686 | 9/1967 | Jewel et al. | 424—61 |
| 3,483,289 | 12/1969 | Michaelson et al. | 424—61 |

FOREIGN PATENTS

| | | |
|---|---|---|
| 1,309,399 | 1962 | France. |
| 1,482,993 | 6/1967 | France. |
| 1,517,862 | 3/1968 | France. |
| 1,527,405 | 5/1968 | France. |

OTHER REFERENCES

Sagarin: Cosmetics, Science and Technology, pp. 678–87, 1966.

SAM ROSEN, Primary Examiner

UNITED STATES PATENT OFFICE
CERTIFICATE OF CORRECTION

Patent No. 3,849,547          Dated   November 19, 1974

Inventor(s) Gregoire Kalopissis

It is certified that error appears in the above-identified patent and that said Letters Patent are hereby corrected as shown below:

In the Heading:

Claims priority, application Luxembourg, August 5, 1966, 51709; January 6, 1967, 52758; and Great Britain, August 3, 1967, 35,691.

In the Specification:

Col. 6, lines 7-9, change the formula to read:

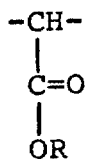

Col. 8, lines 30-37, change the formula to read:

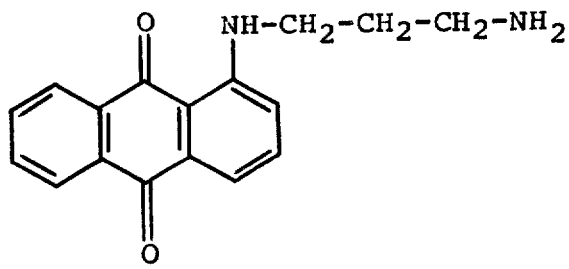

Signed and sealed this 1st day of July 1975.

(SEAL)
Attest:

RUTH C. MASON
Attesting Officer

C. MARSHALL DANN
Commissioner of Patents
and Trademarks